United States Patent Office 2,796,056
Patented June 18, 1957

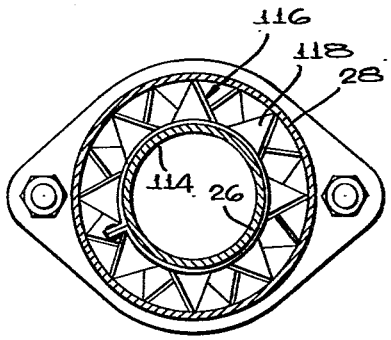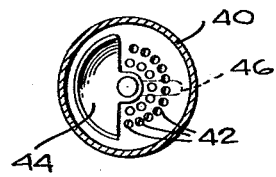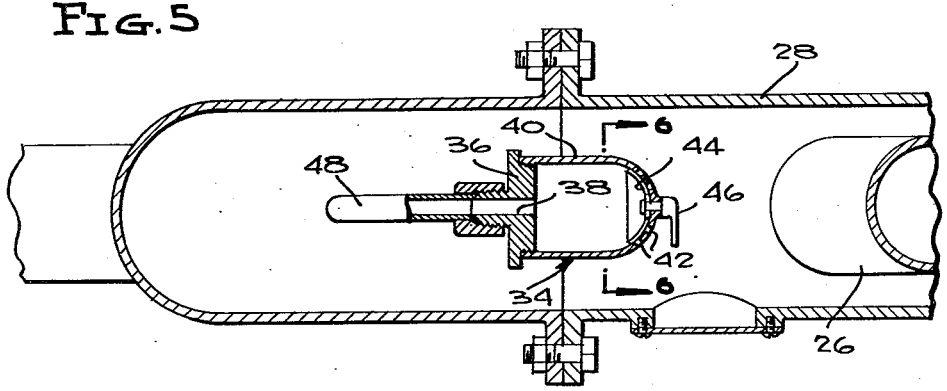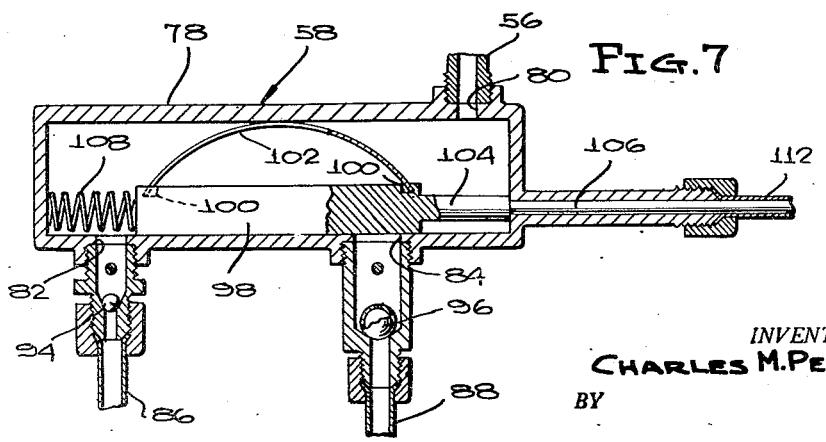

2,796,056

FUEL INJECTION MECHANISM FOR AN INTERNAL COMBUSTION ENGINE

Charles M. Perkins, Philadelphia, Pa.

Application October 21, 1955, Serial No. 541,947

5 Claims. (Cl. 123—127)

This invention relates to a fuel injection mechanism for an internal combustion engine and has for its primary object to supply liquid fuel to the intake manifold of a convention internal combustion engine in which the liquid fuel is vaporized and mixed with air to produce a combustible mixture.

Another object is to employ the heat of the exhaust gases to vaporize the liquid fuel.

A further object is to automatically supply to the engine a low grade liquid fuel after the engine has attained a predetermined temperature at which the low grade liquid fuel will vaporize within the intake manifold.

A still further object is to automatically control the pressure of the liquid fuel in the fuel injection line in accordance with the pressure of the combustible mixture within the intake manifold.

The above and other objects may be attained by employing this invention which embodies among its features a supply of liquid fuel, a nozzle within the intake manifold of an internal combustion engine, a fuel pump operatively connected with the supply of liquid fuel and the injection nozzle, a by-pass connected to the intake and discharge side of the fuel pump, and pressure actuated means connected to the intake manifold and to the by-pass for regulating the pressure of liquid fuel entering the intake manifold in accordance with the pressure of the combustible mixture in said intake manifold.

Other features include a valve having a discharge passage extending through one side thereof, longitudinally spaced inlet passages extending through the opposite side of said valve, a slide mounted within said valve for selectively covering and uncovering the inlet passages, a source of high grade fuel connected to one of the inlet ports, a source of low grade fuel connected to the opposite inlet port, yielding means within the valve and engaging the slide for yieldingly urging it into covering relation to the low grade fuel inlet port and in open relation to the high grade fuel inlet port, and thermally actuated means operatively connected to the intake manifold and to the slide for moving it against the effort of the spring and covering the high grade fuel inlet port and opening the low grade fuel inlet port when the temperature of the engine attains a predetermined value.

In the drawings:

Figure 4 is an enlarged transverse sectional view taken substantially on the line 4—4 of Figure 2;

Figure 5 is a fragmentary enlarged sectional view taken substantially on the line 5—5 of Figure 2;

Figure 6 is a sectional view taken substantially on the line 6—6 of Figure 5; and Figure 7 is an enlarged fragmentary sectional view taken substantially on the line 7—7 of Figure 3.

Figure 1:
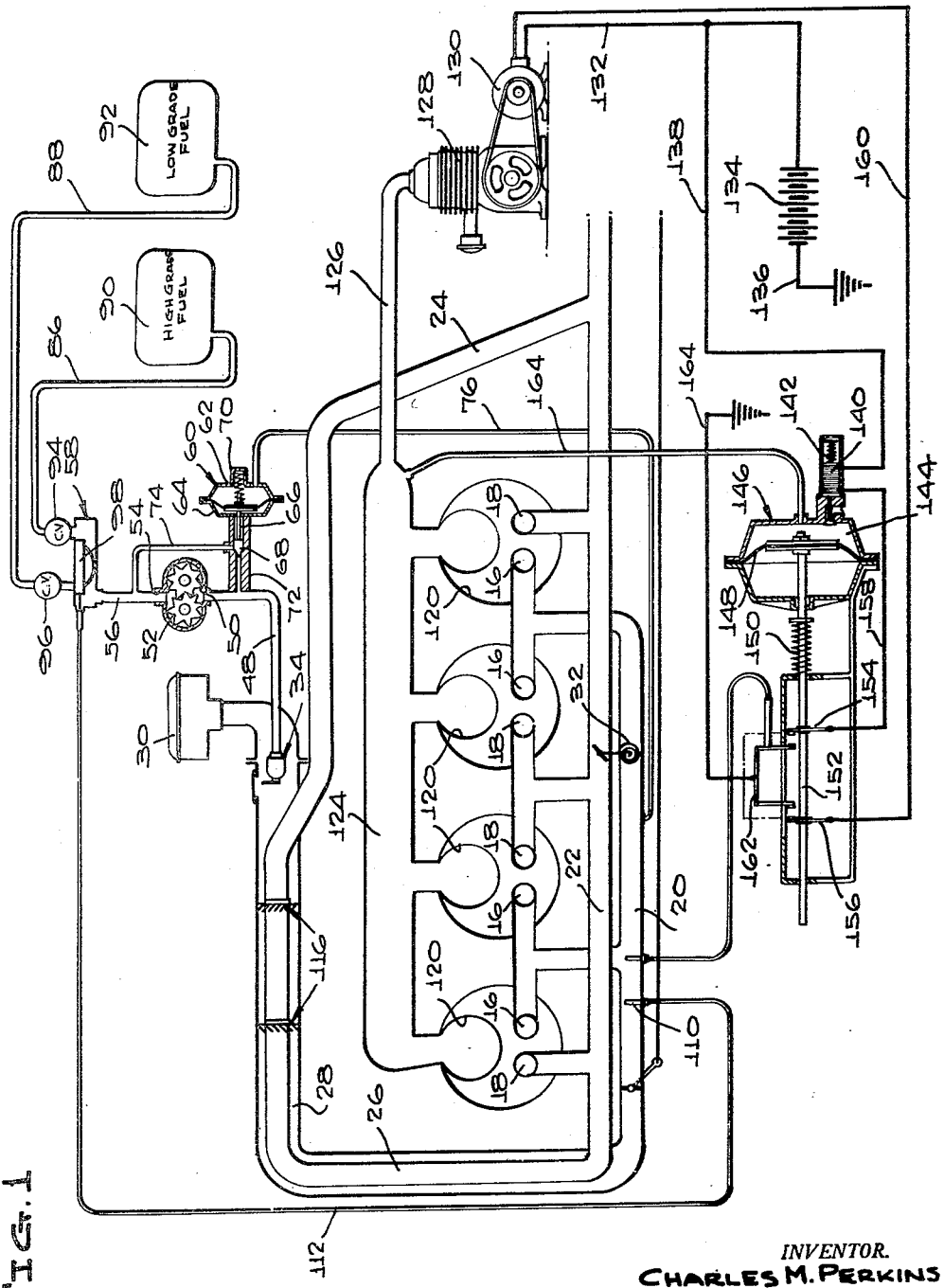
Figure 1 is a diagrammatic view of an engine showing this improved fuel injection system operatively connected thereto.
Figure 2:
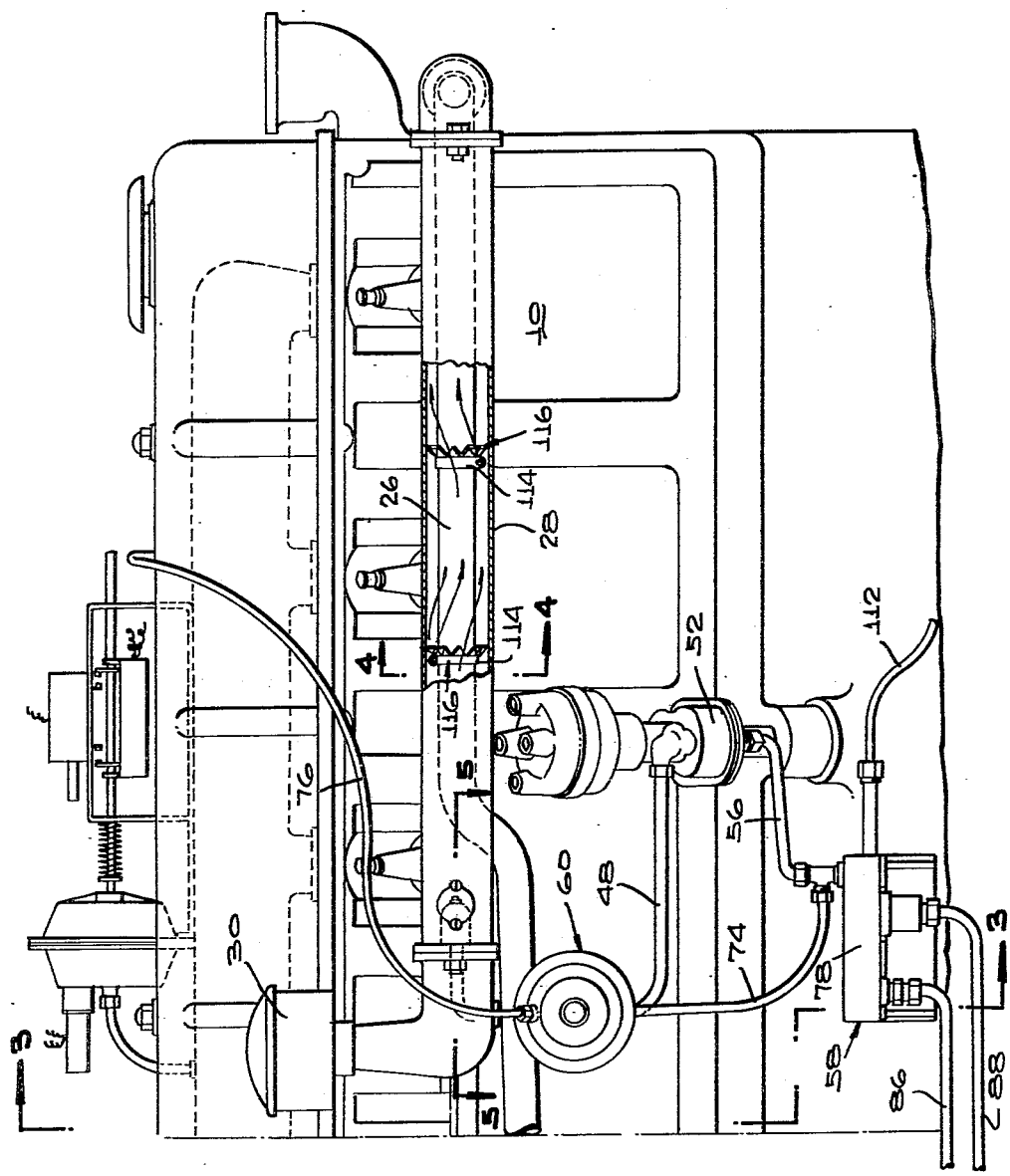
Figure 2 is a fragmentary view of an engine showing this fuel injection system connected thereto.
Figure 3:
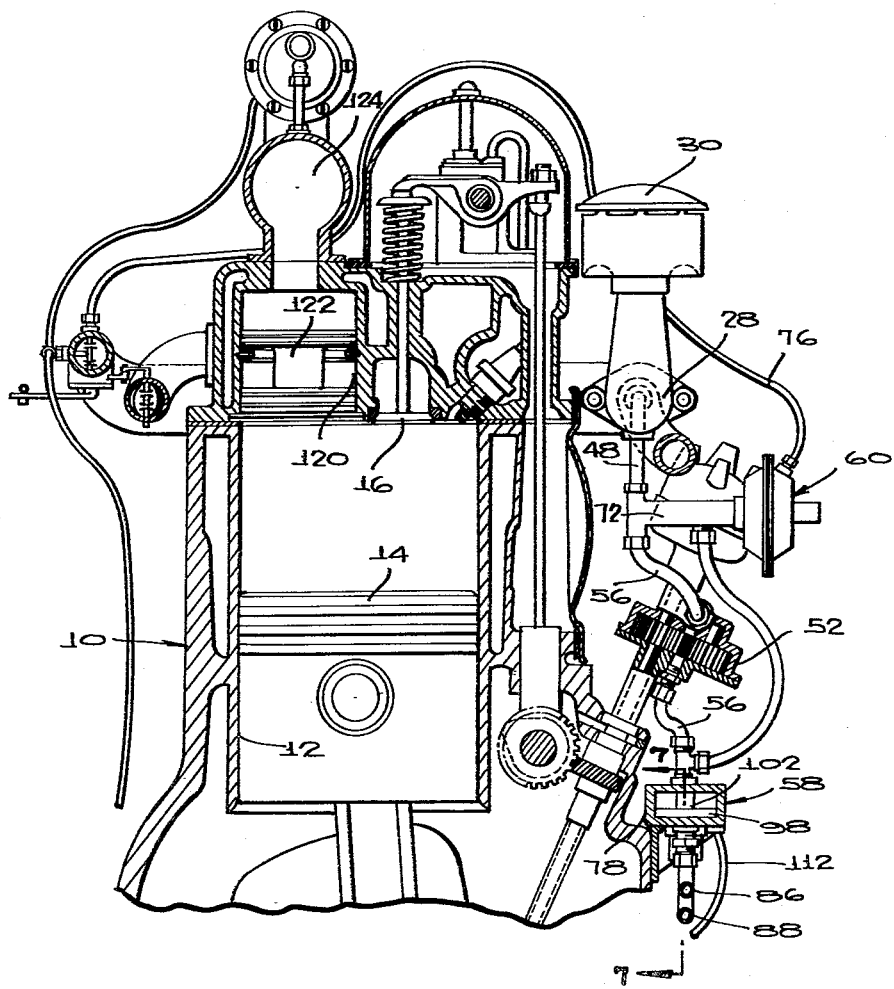
Figure 3 is a vertical sectional view taken substantially on the line 3—3 of Figure 2.

Referring to the drawings in detail, an internal combustion engine designated generally 10 includes cylinders 12 in which pistons 14 are mounted to operate in a conventional manner. The engine 10 is equipped with conventional intake and exhaust valves 16 and 18, respectively, and opening into the respective cylinders 12 and connected to the intake valves 16 are the conventional branches of an intake manifold 20. The exhaust valves 18 are conventionally connected to an exhaust manifold 22 which unlike the conventional exhaust manifold is connected through a by-pass 24 which defines with the exhaust manifold a heat exchanging loop 26, a portion of which is contained within an enlarged portion 28 of the intake manifold 20 so as to be in heat exchanging relation to the intake manifold. The end of the intake manifold opposite that connected to the branches which lead to the intake valves 16 is connected through an air cleaner 30 with atmosphere.

In the preferred form of the invention, the exhaust manifold 22 is provided between its exhaust end and the by-pass 24 with a thermostatically actuated valve 32 which, when the engine is cool, tends to obstruct the passage of the exhaust gases to the tail pipe of the vehicle on which the device is used and to by-pass the exhaust gases through the leg 24 and portion 26 of the exhaust manifold which is contained within the enlarged portion 28 of the intake manifold 20.

A liquid fuel discharge nozzle 34 is disposed within the enlarged portion 28 of the intake manifold 20 adjacent the end thereof through which the air enters from the air cleaner 30 and this nozzle comprises a flange 36 having an axial passage 38 extending therethrough and threadedly engaged with the flange 36 is a dome-shaped body 40 having a group of passages 42 extending therethrough. Mounted within the dome-shaped body for rotation about the axis thereof which aligns with the axis of the flange 36 is a shutter 44 which is adapted to rotate within the dome-shaped body to selectively cover and uncover the openings 42. A handle 46 extends through the dome-shaped cover or cap 40 in axial alignment with the longitudinal axis thereof and is operatively connected to the shutter 44 for rotating it to cover and uncover selected openings 42.

Connected to the flange 36 and extending through the enlarged portion 28 of the intake manifold 20 is a fuel injection line 48 which is connected to the discharge port 50 of a fuel pump 52 and connected to the intake port 54 of said fuel pump 52 is a fuel line 56 which is selectively connected to a source of high grade fuel or a source of low grade fuel through the medium of a thermostatically controlled valve designated generally 58.

The pressure at which the fuel is injected into the enlarged portion 28 of the intake manifold 20 through the nozzle 34 is regulated by a fuel pressure regulator designated generally 60 which comprises a hollow body 62 in which works a diaphragm 64 carrying a valve stem 66 which extends through one side of the hollow body 62 and carries a valve 68 which is normally projected outwardly relative to the body 62 by means of a compression coiled spring 70 which seats on the body 62 and engages the side of the diaphragm opposite the valve stem 66. The valve 68 works in a valve body 72 which is connected to the fuel injection line between the fuel pump 52 and the fuel discharge nozzle 34 and establishing communication between the valve body 72 and the fuel line 56 between the fuel pump 52 and the thermostatically actuated valve 58 is a by-pass duct 74. It will thus be seen that when the valve stem 66 is moved against the effort of the spring 70, the valve 68 will open and permit liquid fuel passing through the pump to be recirculated through the by-pass so as to prevent the fuel from passing through the fuel discharge nozzle 34 at excessive pressure. A vacuum pipe 76 is connected to the body 62 on the side of the diaphragm 64 adjacent the spring 70 and is also connected to the intake manifold 20 in the area of the branches leading to the ports 16, so that as the vacuum in the manifold 20 increases, the diaphragm 64 will flex move the valve 68 against the effort of the spring 70 and allow the liquid fuel to discharge through the by-pass 74 and simply be recirculated by the pump 52, until such time as the pressure in the manifold 20 increases to a selected value.

The valve 58 above referred to is designed to automatically change from a high grade fuel to a low grade fuel as the temperature of the engine rises and this valve comprises a hollow elongated valve body 78 having a discharge port 80 extending therethrough adjacent one end thereof. This discharge port is connected to the fuel line 56, as will be readily understood upon reference to the drawings. Extending through the valve body 78 in longitudinally spaced relation are inlet ports 82 and 84 which are respectively connected through fuel supply lines 86 and 88 to fuel supply tanks 90 and 92 containing respectively high grade fuel and low grade fuel. In the preferred form of the invention, the junctions of the ports 82 and 84 with their respective fuel supply lines 86 and 88 are equipped with ball check valves 94 and 96 which will serve to prevent the interchange of low grade and high grade fuels during the movement of the slide, to be more fully hereinafter described. The slide above referred to comprises a block 98 having notches 100 opening through one side thereof adjacent opposite ends and seated in said notches 100 is a bowed spring 102 which bears against the side of the valve body 78 remote from that through which the ports 82 and 84 extend. A stem 104 projects longitudinally from the slide 98 to define a stop which will limit the movement of the slide 98 in one direction by engagement with an end of the body 78. Carried by the stem and extending longitudinally therefrom through the adjacent end of the body 78 is a push rod 106, the purpose of which will hereinafter appear. Disposed between the end of the slide valve 98 remote from the stem 104 and the adjacent end wall of the valve body 78 is a compression coiled spring 108 which yieldingly urges the slide 98 into uncovering relation to the port 82 and into covering relation with the port 84. Coupled in any conventional manner with the push rod 106 and to a suitable thermostat 110 mounted in the intake manifold 20 is a flexible member 112 which is adapted to be actuated by the thermostat 110 to move the push rod 106 and valve 98 against the effort of the spring 108 to cover the port 82 and uncover the port 84 when the temperature of the engine attains a predetermined value. It will thus be seen that when the engine attains a high enough temperature, the valve 58 will be actuated to switch from high grade to low grade fuel.

Clamped as by a clamping ring 114 to the exhaust manifold loop 26 within the enlarged portion 28 of the intake manifold 20 are longitudinally spaced fuel vaporizing agitators designated generally 116, each comprising circumferentially spaced vanes 118 of substantially triangular shape, the apices of which contact the inner surface of the enlarged portion 28 of the intake manifold 20. The vanes of adjacent rings 114 are angled in opposite directions to create a turbidity in the liquid fuel and air passing through the loop 28 of the intake manifold.

In the preferred form of the invention, I employ a compression mechanism disclosed in detail in a co-pending application for patent which comprises constant compression cylinders 120 carried by the cylinder head of the engine and having pistons 122 working therein which are advanced toward the combustion chambers of the engine cylinders 112 under the influence of air pressure within a manifold 124 which is connected through the medium of a pipe 126 to a compressor 128 which pumps air into the manifold 124 to advance the pistons 122 toward the combustion chambers of the engine cylinders 112 under yielding pressure. The pump 128 is powered by a conventional electric motor 130, one terminal of which is connected to a conductor 132 to one terminal of a power source 134, the opposite terminal of which is grounded as at 136. A lead 138 is connected to the conductor 132 and to one terminal of an electromagnetically actuated valve 140 which is normally held closed under the influence of a compression coiled spring 142. The valve 140 comprises a pressure release valve for leading air pressure from the chamber 144 of an automatic compression control device 146 which contains a diaphragm 148 which is normally flexed under the influence of a compression coiled spring 150 into the chamber 144. Carried by the diaphragm and extending longitudinally from the automatic compression control mechanism 146 is a plunger 152 carrying spaced contacts 154 and 156 which are connected respectively through conductors 158 and 160 to the electromagnetic pre-actuated valve 140 and the motor 130. A stationary contact 162 is mounted between the spaced contacts 154 and 156 and is connected through a conductor 164 to ground so that as the push rod 152 moves under the influence of the spring 150, the contact 156 will engage the contact 162 to energize the motor 130. On the other hand, when the contact 156 is moved out of engagement with the ground contact 162 and the pressure in the chamber 144 is sufficient to advance the push rod 152 against the effort of the spring 150, the contact 154 will be engaged with the contact 162 and the electromagnetically actuated valve 140 will be opened to exhaust pressure from the chamber 144. A duct 164 connects the chamber 144 with the manifold 124 and it will thus be seen that fluctuations of pressure in the manifold 124 will be maintained at a minimum by the automatic compression control mechanism 146.

In use, it will be evident that with the engine in operation, the pump 52 which is connected thereto will be driven thereby and with the port 82 in the valve body 78 uncovered, as illustrated in Figure 7, under the influence of the spring 108, the engine will operate when high grade fuel conducted from the fuel supply 90 through the conduit 86, check valve 94, valve 58, fuel line 56, and fuel injection line 48, to the fuel discharge nozzle 34 from whence it enters the enlarged portion 28 of the intakes manifold 22 of the engine. Being high grade fuel, the liquid entering the manifold through the discharge nozzle 34 will rapidly vaporize in the air which is being drawn into the manifold and enters the engine as a conventional combustible mixture. As the temperature of the engine increases, a thermostat 110 will operate to move the push rod 106 and advance the slide valve 98 against the effort of the spring 108 to uncover the port 84 and close the port 82 so that low grade fuel may enter the pump 52 from the supply 92 through the duct 88 into the check valve 96 and thence through the fuel line 56, pump 52 and fuel injection line 48 into the manifold through the fuel discharge nozzle 34. By means of the vanes 118 of the fuel vapor agitators 116 and because of the heated condition of the portion 28 of the intake manifold, the heavier fuel will be vaporized and mixed with air entering the manifold through the air cleaner 30 to be delivered to the engine through the intake valves 116. Should the vacuum in the intake manifold 20 exceed a predetermined value, the diaphragm 64 will flex against the effort of the spring 70 and unseat the valve 68 to permit a circulation of liquid fuel from the fuel injection line to the fuel line and thereby relieve the pressure of the fuel entering the enlarged portion 28 of the intake manifold. The thermostatic valve 32 will serve to retard the flow of the exhaust gases through the muffler and tail pipe of the engine and cause a portion thereof to pass through the loop 26 and out of the by-pass 24 to maintain the temperature of the loop 26 at a selected level.

As soon as the engine stops, the low grade fuel drops from entire injection system past floating check valve 96, thus ridding system of this low grade fuel which cannot vaporize or burn while engine is cold. After engine became cold, thermostat 110 has weakened pressure valve 98 through linkage 106, thus allowing spring 108 to press valve 98 to right (in Fig. 7) covering port 84 and uncovering port 82 which is the high grade fuel.

While this engine is cold, thermostat operating switch 164 was come in contact with 154 to operate solenoid operated relief valve 140, thus bringing compression pressure to a very low level. As engine is cranked, fuel pump 52 pulls high grade fuel from tank, puts it under pressure where it is forced through nozzle 34 into intake manifold. As engine starts idle and vacuum in intake manifold becomes high, this vacuum on spring side of diaphragm 64 helps overcome spring 70, allowing fuel to by-pass past valve 68 through line 74 to suction side of pump, thus allowing fuel pressure to drop. Engine has now started cold on a high grade fuel, at relatively low compression and combustion pressures, with a fairly rich mixture. As engine begins to warm up, thermostat has moved switch 162 outward until contact is made at 156 which starts compressor and begins building up compression pressure. As this pressure increases, pressure at 144 overcomes spring 150, thus forcing rod 152 leftward (Fig. 1), and when there is no longer contact at 156, compressor stops. As compression pressure rises, engine operates more efficiently which means also a higher vacuum in intake manifold, which in turn directly regulates mixture going through nozzle 34. By the time engine is thoroughly warmed up, it is operating under very high pressures with a very lean mixture, which is too lean to pre-ignite from these very high temperatures and pressures. Since it cannot pre-ignite, we now shift to low grade fuel automatically by thermostat 110, overcoming spring 108 which allows gate to cover high grade fuel port 82 and uncover low grade port 84.

Obviously, by employing this fuel injection system, the transfer from a high grade fuel to a low grade fuel and from a low grade fuel to a high grade fuel will be automatically effected and consequently considerable saving in the operation of internal combustion engines may be afforded.

While in the foregoing there has been shown and described the preferred embodiment of this invention, it is to be understood that minor changes in the details of construction, combination and arrangement of parts may be referred to without departing from the spirit and scope of the invention as claimed.

What is claimed is:

1. In an internal combustion engine of the type having an exhaust manifold, an intake manifold in heat exchanging relation to the exhaust manifold, a fuel injection nozzle within the intake manifold, a fuel pump operatively connected to the engine and to the fuel injection nozzle for delivering fuel into the intake manifold through said nozzle, means for changing from a high grade fuel to a low grade fuel as the temperature of the engine increases and changing from a low grade fuel to a high grade fuel as the temperature of the engine diminshes, said means comprising a valve casing carried by the engine and having a fuel discharge port extending therethrough and connected to the pump, said valve casing having a pair of spaced fuel inlet ports extending therethrough and respectively connected to a source of high grade fuel and a source of low grade fuel, a valve within said valve casing and movable therein for selectively uncovering the inlet ports and directing fuel through the outlet port, yielding means carried by the valve casing and operatively engaging the valve to hold said valve under yielding pressure in open relation to the high grade fuel inlet port, and thermally actuated means carried by the intake manifold and operatively connected to the valve for moving it against the effort of the yielding means to cover the high grade fuel intake port and uncover the low grade fuel intake port when the engine attains a predetermined temperature.

2. In an internal combustion engine of the type having an exhaust manifold, an intake manifold in heat exchanging relation to the exhaust manifold, a fuel injection nozzle within the intake manifold, a fuel pump operatively connected to the engine and to the fuel injection nozzle for delivering fuel into the intake manifold through said nozzle, means for changing from a high grade fuel to a low grade fuel as the temperature of the engine increases and changing from a low grade fuel to a high grade fuel as the temperature of the engine diminishes, said means comprising a valve casing carried by the engine and having a fuel discharge port extending therethrough and connected to the pump, said valve casing having a pair of spaced fuel inlet ports extending therethrough, means operatively connected to said valve casing and communicating with an inlet port for delivering high grade fuel into the valve casing, means operatively connected to the valve casing and communicating with the other inlet port for delivering low grade fuel into said valve casing, a valve within said valve casing and movable therein for selectively uncovering the inlet ports and directing fuel through the outlet port, a spring mounted within the valve casing and operatively engaging the valve for holding said valve in open relation to the high grade fuel inlet port, and thermally actuated means carried by the intake manifold and operatively connected to the valve for moving it against the effort of the spring to cover the high grade fuel inlet port and uncover the low grade fuel inlet port when the engine attains a predetermined temperature.

3. In an internal combustion engine of the type having an exhaust manifold, an intake manifold in heat exchanging relation to the exhaust manifold, and a fuel pump operatively driven by the engine and connected to a source of liquid fuel and to the fuel injection nozzle for directing liquid fuel under pressure into the intake manifold, means for regulating the pressure of the fuel injected into the intake manifold comprising a by-pass conduit connected to the pump on the inlet side and outlet sides thereof and establishing communication between opposite sides of said pump, a valve mounted in said by-pass conduit for crossing the passage therethrough and preventing the flow of liquid fuel from the discharge side of the pump to the inlet side of the pump, yielding means carried by the by-pass conduit and operatively connected to the valve for holding it closed under yielding pressure, and pressure responsive means connected to the intake manifold and operatively connected to the valve for moving it against the effort of the yielding means and opening the passage through the by-pass conduit when the pressure of the combustible mixture in the intake manifold attains a predetermined value.

4. A valve for selectively delivering high grade or low grade liquid fuel to an internal combustion engine comprising a hollow body having a discharge port opening through one side thereof and longitudinally spaced inlet ports opening through the opposite side thereof, a slide mounted in said body to move longitudinally therein and selectively uncover an inlet port, a bowed spring carried by the slide and bearing on the side of the hollow body remote from the inlet ports to hold the slide in close contact with the wall of the body adjacent the inlet ports, yielding means engaging the valve body and bearing on the slide to hold said slide in covering relation to an inlet port, and thermally actuated means extending through the valve body and operatively engaging to the slide for moving it against the effort of the yielding means to cover the open inlet port and uncover the other inlet port.

5. A fuel system for an internal combustion engine comprising an exhaust manifold, an intake manifold surrounding a portion of the exhaust manifold and in heat exchanging relation thereto, means carried by the intake manifold and operatively connected thereto for introducing air into one end thereof, a fuel nozzle mounted in the intake manifold for spraying liquid fuel into the heated portion of said intake manifold adjacent the end thereof into which the air is introduced, a thermostatically actuated valve mounted in the exhaust manifold to regulate the flow of hot gases through the portion thereof that is in heat exchanging relation to the intake manifold, and fuel vaporizing agitators carried by the exhaust manifold and extending outwardly therefrom within the intake manifold and in heat exchanging relation therewith.

References Cited in the file of this patent

UNITED STATES PATENTS

| | | |
|---|---|---|
| 1,947,407 | Cornell | Feb. 13, 1934 |
| 1,998,636 | Porter | Apr. 23, 1935 |
| 2,163,241 | Huber | June 20, 1939 |